United States Patent
Inada

(10) Patent No.: US 9,419,744 B2
(45) Date of Patent: Aug. 16, 2016

(54) POLARIZATION MULTIPLEXING OPTICAL TRANSMITTER AND OPERATION CONTROL METHOD

(71) Applicant: NEC Corporation, Tokyo (JP)

(72) Inventor: Yoshihisa Inada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/418,286

(22) PCT Filed: May 7, 2013

(86) PCT No.: PCT/JP2013/002937
§ 371 (c)(1),
(2) Date: Jan. 29, 2015

(87) PCT Pub. No.: WO2014/020804
PCT Pub. Date: Feb. 6, 2014

(65) Prior Publication Data
US 2015/0229433 A1 Aug. 13, 2015

(30) Foreign Application Priority Data
Aug. 1, 2012 (JP) .................................. 2012-170697

(51) Int. Cl.
*H04B 10/00* (2013.01)
*H04J 14/00* (2006.01)
(Continued)

(52) U.S. Cl.
CPC .............. *H04J 14/06* (2013.01); *H04B 10/255* (2013.01); *H04B 10/2557* (2013.01);
(Continued)

(58) Field of Classification Search
CPC ............................... H04B 10/532; H04J 14/06
See application file for complete search history.

(56) References Cited

U.S. PATENT DOCUMENTS

| 2003/0108265 A1 | 6/2003 | Rao et al. |
| 2010/0080571 A1* | 4/2010 | Akiyama ............. G02F 1/0123 398/184 |

(Continued)

FOREIGN PATENT DOCUMENTS

| CN | 1 01 431 489 A | 5/2009 |
| CN | 102144362 A | 8/2011 |

(Continued)

OTHER PUBLICATIONS

T. Ito et al., "Improvement of PMD tolerance for 110Gb/s pol-mux RZ-DQPSK signal with optical pol-dmux using optical PMD compensation and asymmetric symbol-synchronous chirp", Optical Fiber Communication Fiber Conference, pp. 1-3, Mar. 2009.

(Continued)

*Primary Examiner* — Daniel Dobson
(74) *Attorney, Agent, or Firm* — Finnegan, Henderson, Farabow, Garrett & Dunner LLP

(57) ABSTRACT

A polarization multiplexing optical transmitter of the present invention includes frequency dividing means (21) that performs frequency dividing on a clock signal having a Baud rate frequency, phase modulation means (8) that performs phase modulation on a light signal in accordance with the clock signal having undergone the frequency dividing, branching means (2) that branches the phase-modulated light into two light signals, delay means (10) that delays one branched light signal relative to the other branched light signal to generate light signals having phases inverted relative to each other, and polarization multiplexing means (5) that synthesizes the generated signals lights with orthogonal polarizations to generate a polarization multiplexed signal. Hence, the polarization multiplexing optical transmitter that can further improve the signal quality can be accomplished.

7 Claims, 16 Drawing Sheets

(51) Int. Cl.
*H04J 14/06* (2006.01)
*H04B 10/255* (2013.01)
*H04B 10/2557* (2013.01)
*H04B 10/548* (2013.01)
*H04B 10/50* (2013.01)
*H04B 10/532* (2013.01)
*H04L 27/20* (2006.01)
*H04J 14/04* (2006.01)

(52) U.S. Cl.
CPC ......... *H04B 10/5053* (2013.01); *H04B 10/532* (2013.01); *H04B 10/548* (2013.01); *H04J 14/00* (2013.01); *H04J 14/04* (2013.01); *H04L 27/2096* (2013.01)

(56) References Cited

U.S. PATENT DOCUMENTS

2011/0150465 A1 6/2011 Ito
2012/0321303 A1* 12/2012 Zhang ................. H04B 10/532
398/45
2012/0321311 A1* 12/2012 Zhang .................... H04J 14/06
398/65

FOREIGN PATENT DOCUMENTS

| CN | 102396170 A | 3/2012 |
|---|---|---|
| EP | 0 964 538 A2 | 12/1999 |
| EP | 2 017 982 A1 | 1/2009 |
| JP | 2008-281869 | 11/2008 |
| JP | 2010-148007 | 7/2010 |
| WO | WO 2010/026894 A1 | 3/2010 |
| WO | WO 2011/072720 A1 | 6/2011 |

OTHER PUBLICATIONS

I. Lyubomirsky et al., "Signal Chirp Design for Suppression of Nonlinear Polarization Scattering in DP-QPSK Transmission", Optical Fiber Communication Conference, pp. 1-3, Mar. 2011.
Office Action mailed on Aug. 18, 2015 by the Japanese Patent Office in counterpart Japanese Patent Application No. 2014-527953.
T. Ito et al., "Improvement of PMD tolerance for 110Gb/s pol-mux RZ-DQPSK signal with optical pol-dmux using optical PMD compensation and asymmetric symbol-synchronous chirp", Optical Fiber Communication Conference 2009, pp. 1-3, Mar. 2009.
I. Lyubomirsky et al., "Signal Chirp Design for Suppression of Nonlinear Polarization Scattering in DP-QPSK Transmission", Optical Fiber Communication Conference 2011, pp. 1-3, Mar. 2011.
International Search Report and Written Opinion mailed Jun. 11, 2013 in corresponding PCT International Application.
C. Xie et al., "Suppression of Intrachannel Nonlinear Effects With Alternate-Polarization Formats", Journal of Lighwave Technology, vol. 22, No. 3, Mar. 2004.
Extended European Search Report mailed Mar. 16, 2016, by the European Patent Office in counterpart European Patent Application No. 13825957.7.
Chinese Office Action mailed Apr. 21, 2016, by the Chinese Patent Office in counterpart Chinese Patent Application No. 201380040749.2 Yes.

* cited by examiner

POLARIZATION MULTIPLEXING OPTICAL TRANSMITTER AND OPERATION CONTROL METHOD

CROSS-REFERENCE TO RELATED PATENT APPLICATIONS

This application is a National Stage Entry of International Application No. PCT/JP2013/002937, filed May 7, 2013, which claims priority from Japanese Patent Application No. 2012-170697, filed Aug. 1, 2012. The entire contents of the above-referenced applications are expressly incorporated herein by reference.

TECHNICAL FIELD

The present invention relates to a polarization multiplexing optical transmitter and an operation control method, and in particular, to a polarization multiplexing optical transmitter which synthesizes two light signals having the same wavelength with polarized conditions orthogonal to each other, and which transmits the synthesized signal.

BACKGROUND ART

In optical fiber transmission systems, when the polarization multiplexing scheme that transmits signals using polarized lights with orthogonal polarization is applied, it becomes possible to double the transmission capacity per an optical fiber. In recent years, a digital signal processing technology is applied to a receiver of an optical transceiver, thereby enabling an efficient separation of a polarization multiplexed signal. Hence, the polarization multiplexing scheme is now widely used.

However, it is known that polarization multiplexed signals are affected by non-linear effects (intra-polarized-wave mutual phase modulation: intra-polarized-wave XPM) from orthogonally polarized signals. In addition, polarization multiplexed signals with the same wavelength not only propagate at the same speed in an optical fiber, but also cause similar waveform change when a wavelength dispersion occurs. Accordingly, an adverse effect of the intra-polarized-signal XPM is likely to be accumulated, and thus the signal quality is remarkably deteriorated in accordance with a transmission distance. Hence, in order to transmit the polarization multiplexed signals over a long distance while maintaining the excellent transmission quality, a technology of compensating or easing the waveform distortion caused during the transmission is important.

PTL 1 discloses that, in a transmitter of a light signal transmission system employing the polarization multiplexing scheme, by asymmetrical chirp is added to two light signals (polarized wave components) to perform phase modulation on the two light signals, those signals with polarized conditions orthogonal to each other are synthesized and a polarization multiplexed signal is generated.

According to the technology disclosed in PTL 1, when a wavelength dispersion is caused to the polarization multiplexed signal in a transmission line fiber, the one polarized wave component with an asymmetrical chirp has a time waveform dispersed (spread), while the other polarized wave component has a time waveform compressed (pulse compression). Hence, when the polarization multiplexed signal propagates in an optical fiber, a different waveform change (dispersion or compression) is shown between polarized waves orthogonal to each other at an arbitrary time slot. This is a waveform change that has a weak correlation between the polarized waves, and thus the adverse effect of intra-polarized-wave XPM can be eased.

CITATION LIST

Patent Literature

PTL 1: International Unexamined Patent Publication No. 2010/026894

SUMMARY OF INVENTION

Technical Problem

As explained above, the technology disclosed in PTL 1 can ease the adverse effects of intra-polarized-wave XPM, thereby improving the signal quality. For the polarization multiplexing scheme, however, a technology is also important which compensates or eases not only the adverse effects of intra-polarized-wave XPM, but also a waveform distortion originating from a combined effect of a self-phase modulation (SPM) that is an asymmetrical optical effect in an optical fiber with wavelength dispersion.

It is an objective of the present invention to address the aforementioned technical problems, and to provide a polarization multiplexing optical transmitter and an operation control method which can further improve a signal quality.

Solution to Problem

A polarization multiplexing optical transmitter according to an aspect of the present invention includes: frequency dividing means that performs frequency dividing on a clock signal having a Baud rate frequency; phase modulation means that performs phase modulation on a light signal in accordance with the clock signal having undergone the frequency dividing; branching means that branches the phase-modulated light into two light signals; delay means that delays one branched light signal relative to the other branched light signal to generate light signals having phases inverted relative to each other; and polarization multiplexing means that synthesizes the generated light signals with orthogonal polarizations to generate a polarization multiplexed signal.

A polarization multiplexing optical transmitter according to another aspect of the present invention includes: frequency dividing means that performs frequency dividing on a clock signal having a Baud rate frequency; phase modulation and delay means that performs phase modulation on two light signals having a same wavelength in accordance with the clock signal having undergone the frequency dividing, and delays one light signal relative to the other light signal to generate light signals having phases inverted relative to each other; and polarization multiplexing means that synthesizes the generated light signals with orthogonal polarizations to generate a polarization multiplexed signal.

An operation control method according to the other aspect of the present invention is for a polarization multiplexing optical transmitter, and the method includes: a frequency dividing step for performing frequency dividing on a clock signal having a Baud rate frequency; a phase modulation step for performing phase modulation on a light signal in accordance with the clock signal having undergone the frequency dividing; a branching step for branching the phase-modulated light into two light signals; a delay step for delaying one branched light signal relative to the other branched light signal to generate light signals having phases inverted relative to each other; and a polarization multiplexing step for synthesizing the generated light signals with orthogonal polarizations to generate a polarization multiplexed signal.

An operation control method according to the still other aspect of the present invention is for a polarization multiplexing optical transmitter, and the method includes: a frequency dividing step for performing frequency dividing on a clock signal having a Baud rate frequency; a phase modulation and delay step for performing phase modulation on two light signals having a same wavelength in accordance with the clock signal having undergone the frequency dividing, and delays one light signal relative to the other light signal to generate light signals having phases inverted relative to each other; and a polarization multiplexing step for synthesizing the generated light signals with orthogonal polarizations to generate a polarization multiplexed signal.

Advantageous Effects of Invention

According to the present invention, an advantageous effect that is a further improvement of a signal quality can be accomplished.

DESCRIPTION OF EMBODIMENTS

Figure 1:
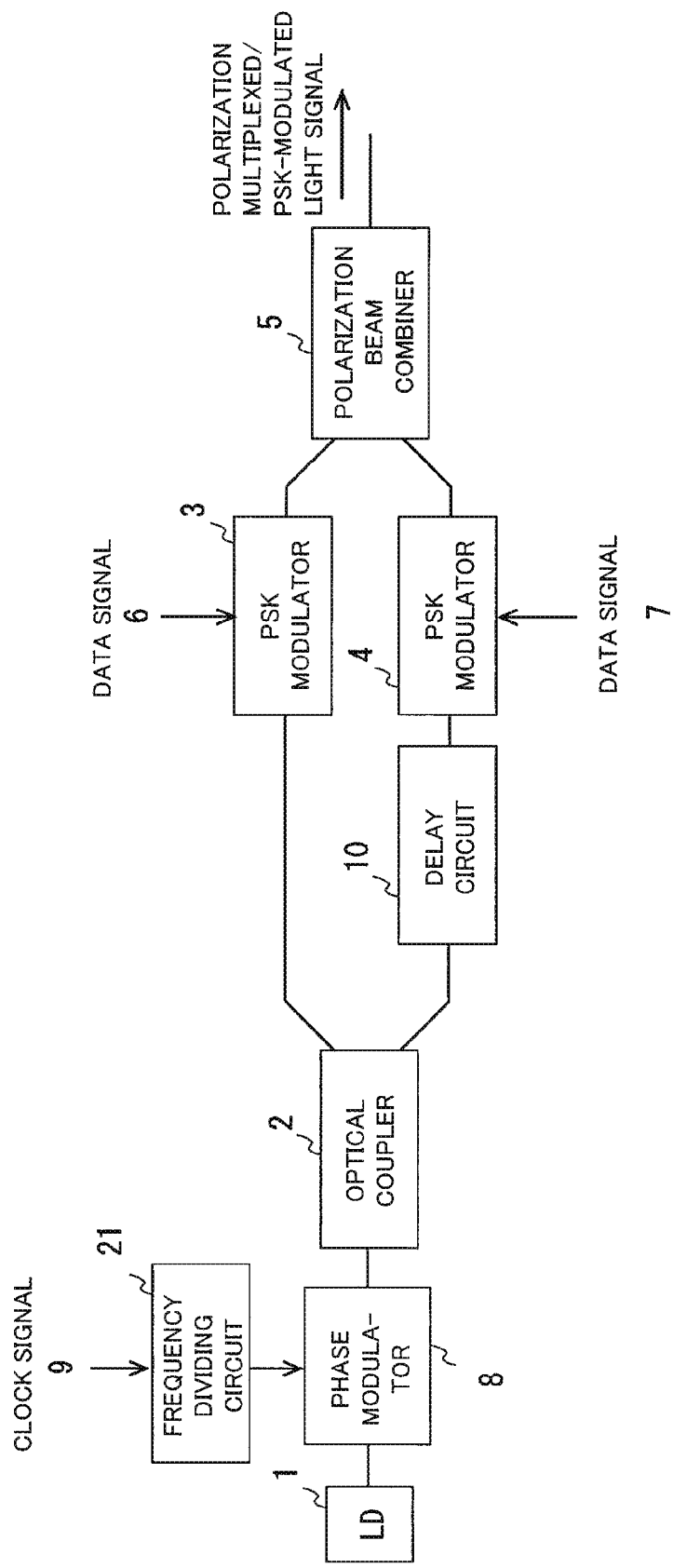
FIG. 1 is a diagram illustrating a structure of a polarization multiplexing optical transmitter according to a first exemplary embodiment of the present invention.

Exemplary embodiments of the present invention will be explained below with reference to the accompanying drawings. FIG. 1 is a diagram illustrating a structure of a polarization multiplexing optical transmitter according to a first exemplary embodiment of the present invention. In FIG. 1, the polarization multiplexing optical transmitter according to the first exemplary embodiment of the present invention includes a laser diode (LD) 1 that is a signal source, a frequency dividing circuit 21 that divides the frequency of a clock signal 9 into half, a phase modulator 8 that performs phase modulation in accordance with the clock signal divided by the frequency dividing circuit 21, an optical coupler 2 to branch the light signal, a delay circuit 10 that delays one light branched by the optical coupler 2, PSK (Phase Shift Keying) modulators 3, 4 that perform data modulation on respective lights branched by the optical coupler 2, and a polarization beam combiner 5 to multiplex PSK modulated lights with polarized conditions orthogonal to each other.

Phase modulation is performed on light output by the LD 1 by the optical phase modulator 8 driven by the clock signal divided by the frequency dividing circuit 21. In this case, the frequency of the clock signal 9 is the same as the rate (Baud rate) of data modulation, and this clock signal 9 is divided to be half frequency by the frequency dividing circuit 21, and is output to the optical phase modulator 8. Subsequently, the phase modulated light is branched by the optical coupler 2 into two lights, and the PSK modulator 3 performs data modulation on one of the two lights in accordance with a data signal 6. The other light is delayed by a time corresponding to a cycle of Baud rate (a cycle of the clock signal 9) by the delay circuit 10, and data modulation is performed on the signal by the PSK modulator 4 in accordance with a data signal 7.

In this case, the reason why a delay is provided by the delay circuit 10 is to invert phases of the two phase modulated lights that are the outputs from the optical coupler 2, and according to this structure, the phase modulation is performed at the half frequency of the clock signal 9. Hence, the amount of delay by the delay circuit 10 is set to be a cycle of Baud rate (a cycle of the clock signal 9). The output lights by the PSK modulators 3 and 4 are polarization-multiplexed with polarized conditions orthogonal to each other by the polarization beam combiner 5, and thus a polarization multiplexed light modulation signal is generated.

Figure 2:
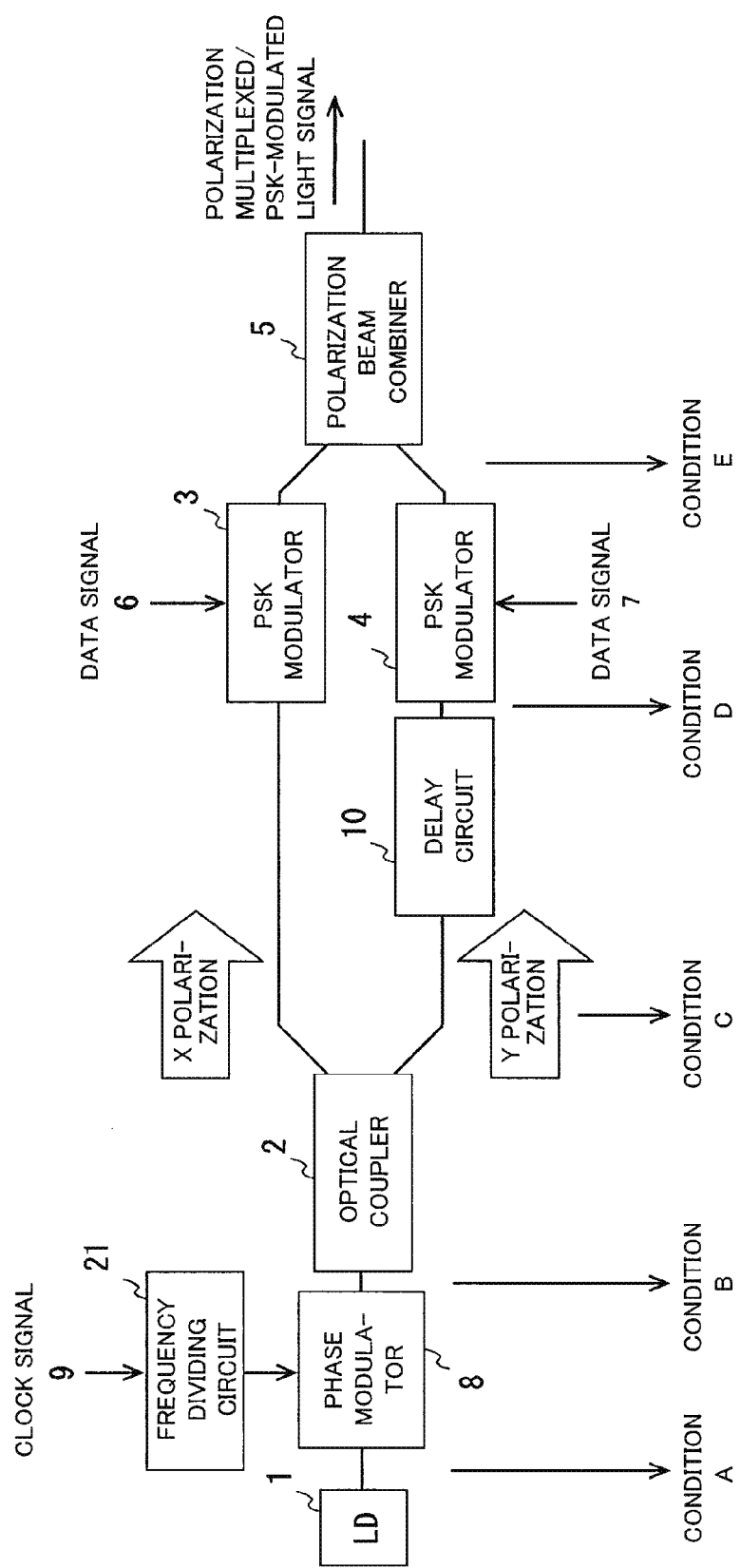
FIG. 2 is a diagram for explaining a transition in a modulation condition in a generating process of a polarization multiplexed light signal according to the structure in FIG. 1.
Figure 3:
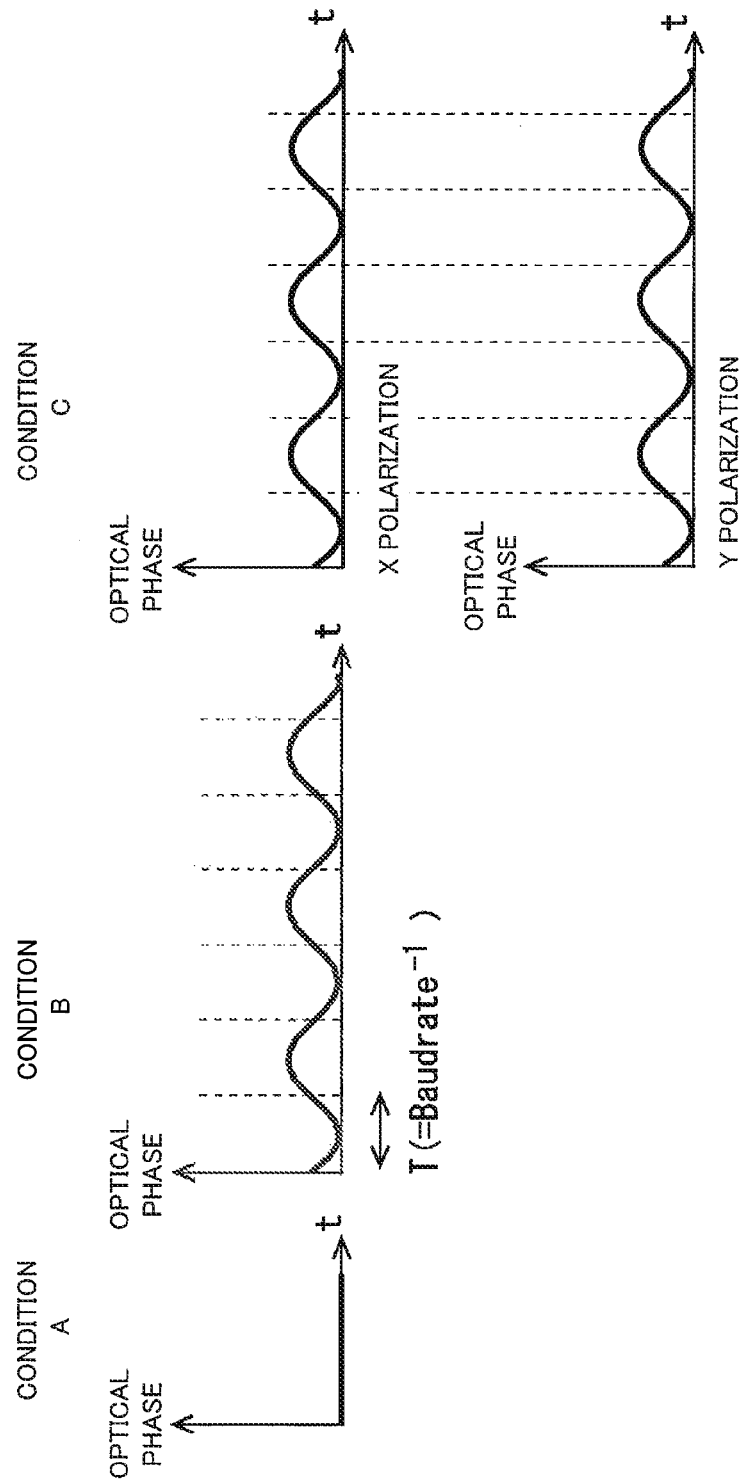
FIG. 3 is a diagram for explaining a transition in a modulation condition in a generating process of a polarization multiplexed light signal according to the structure in FIG. 1.

A transition in a modulation condition in a generating process of a polarization multiplexed light modulation signal according to this exemplary embodiment will be explained with reference to FIGS. 2 to 4. In this example case, the light intensity is always constant over time, and thus the explanation will be given while focusing on the phase condition of light. The phase of light is constant right after output by the LD 1 (condition A). The light becomes a phase condition synchronized with the clock signal 9 divided in half like a condition B by the clock signal 9 divided in half and the phase modulator 8. Two lights (X polarization and Y polarization) right after branched by the optical coupler 2 are in the same phase condition like a condition C.

Then, with delay circuit 10 delaying only Y-polarized light by a cycle of Baud rate, like a condition D, such a light becomes a phase modulated light having the phase inverted relative to the light at the X-polarization side. Subsequently, when the PSK modulators 3, 4 perform data modulation on the respective phase modulated lights, PSK light modulated signals like a condition E are obtained.

Figure 4:
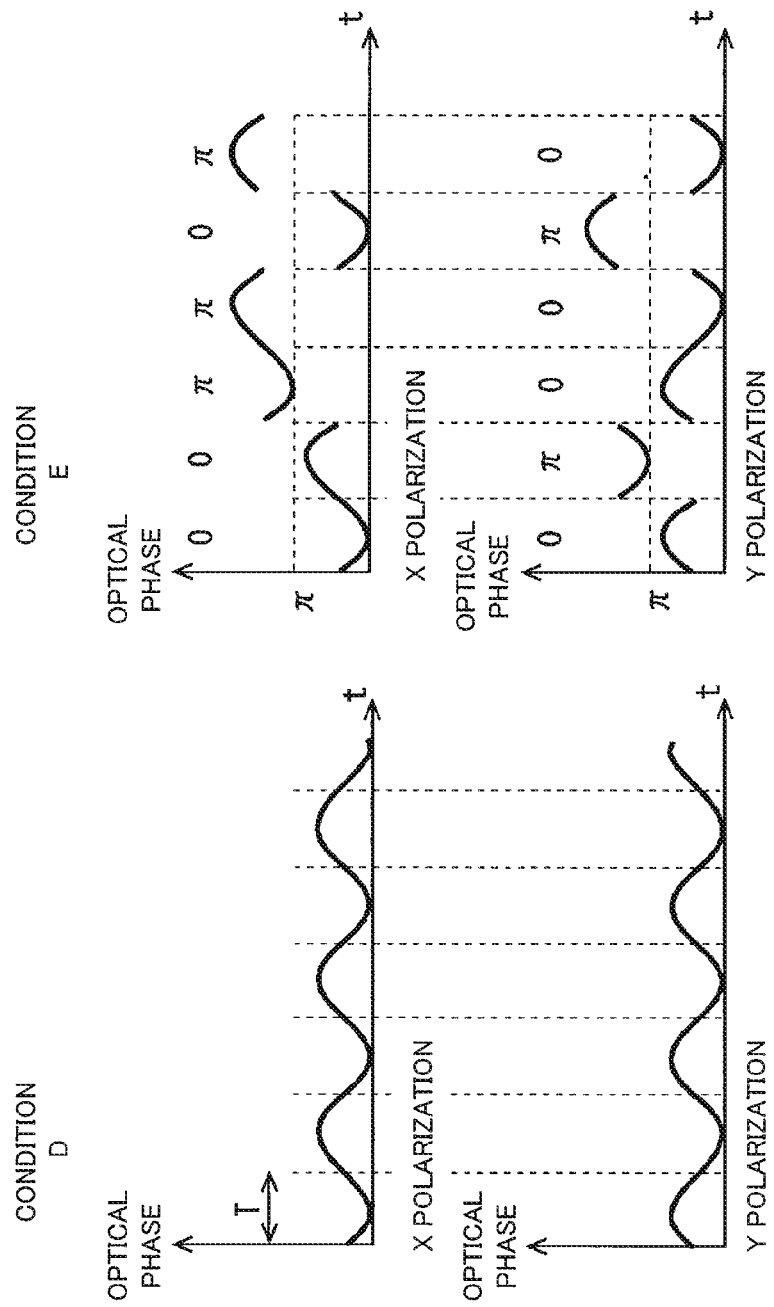
FIG. 4 is a diagram for explaining a transition in a modulation condition in a generation process of a polarization multiplexed light signal according to the structure in FIG. 1.
Figure 5:
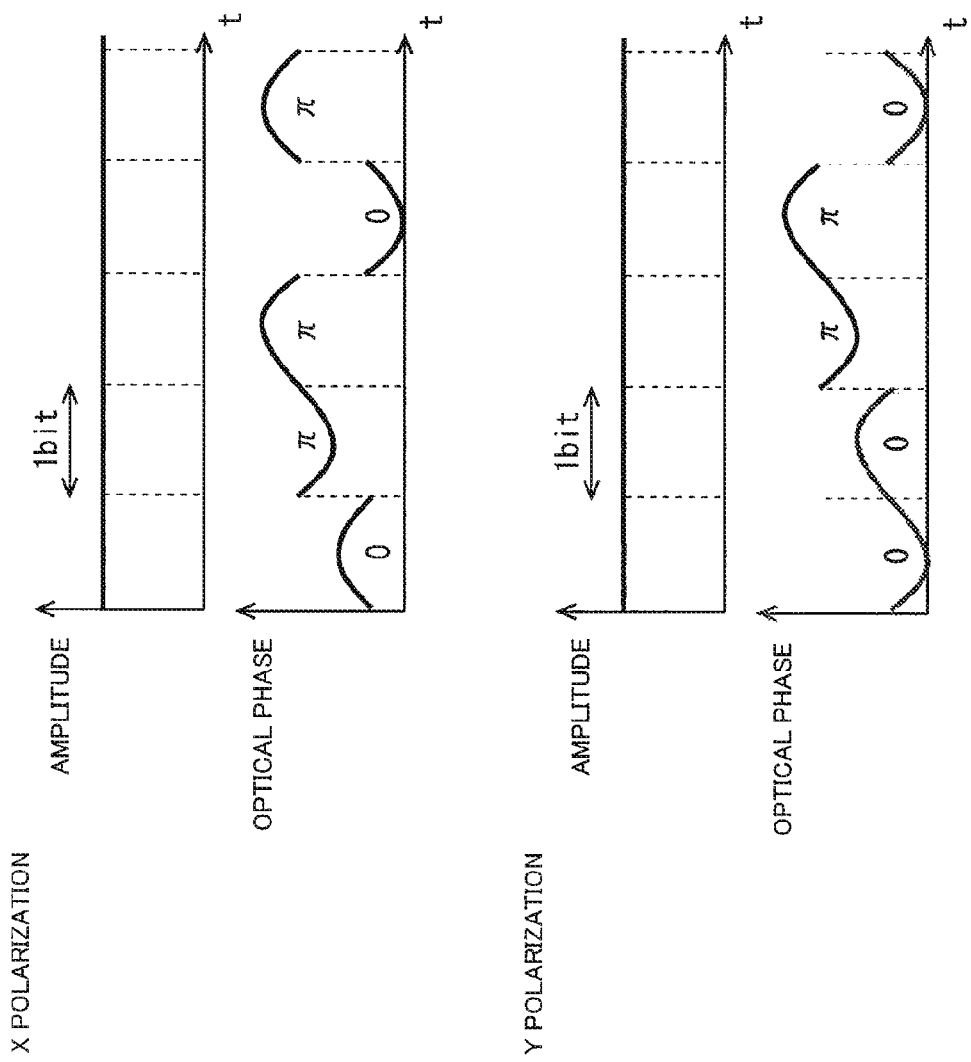
FIG. 5 is a diagram illustrating an example of an optical output by the polarization multiplexing optical transmitter in FIG. 1.

The X and Y polarization light signals become PSK-modulated signals having undergone different data modulations based on the data signals 6, 7, respectively, but like a condition E in FIG. 4 and as illustrated in FIG. 5, when the phase change curves of lights are compared with each other at the same time slot, the phase curves are inverted between the X and Y polarizations. Note that FIG. 5 is a diagram illustrating an example of optical output by the polarization multiplexing optical transmitter in FIG. 1.

As explained above, according to the first exemplary embodiment of the present invention, X and Y polarization light signals are modulated with signals of different polarities (the term polarity in this example means whether the phase modulated waveform (phase curve) is convex upwardly or is concave downwardly). That is, the polarity is inverted between the X polarization and the Y polarization. In addition, according to the first exemplary embodiment of the present invention, as illustrated in FIG. 5, the polarity of phase between adjoining bits in the same polarized wave is further inverted (concave and convex appear alternately for each bit).

Depending on whether the phase modulated waveform (phase curve) is convex upwardly or is concave downwardly, the waveform change (dispersion or compression) when this polarization multiplexed signal suffers a wavelength dispersion in a transmission line fiber differs. In other words, when the polarization multiplexed signal suffers a wavelength dispersion, the signal (bit) on which the phase modulation with the one polarity is applied has a time waveform dispersed (spread), while the signal (bit) on which the phase modulation with the other polarity is applied has a time waveform compressed (pulse compression).

Accordingly, when the polarization multiplexed signal propagates in an optical fiber, a different waveform change (dispersion or compression) is caused between the X/Y polarizations at an arbitrary time slot. This is a waveform change that has a weak correlation between polarized waves. Therefore, the adverse effects of intra-polarized-wave XPM can be eased.

In addition, since the polarity of phase modulation is inverted between the adjoining bit slots in the same polarized wave, during a propagation in an optical fiber, a different waveform change (reverse waveform change in terms of dispersion and compression) occurs between the adjoining bits. Hence, a waveform distortion originating from a combined effect of a self-phase modulation (SPM) that is nonlinear optical effect in an optical fiber with wavelength dispersion can be suppressed, thereby improving the signal quality after a transmission.

Figure 6:
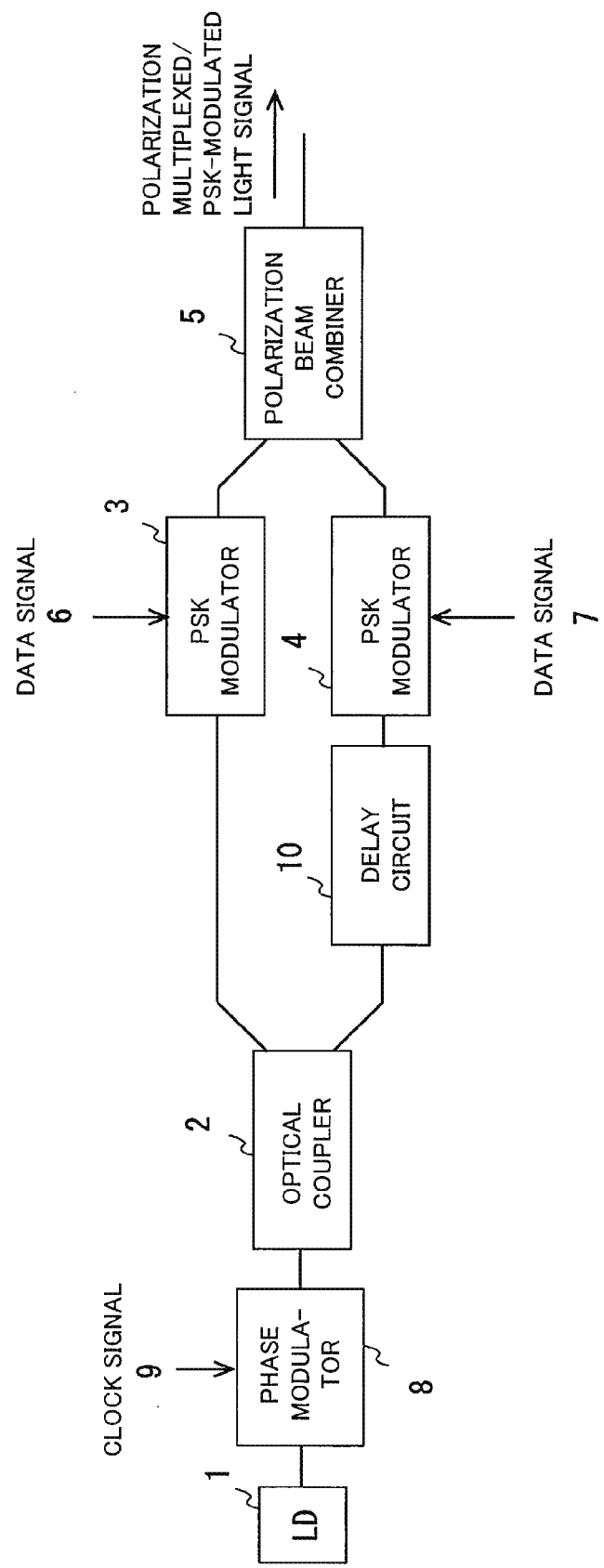
FIG. 6 is a diagram illustrating a structure of a polarization multiplexing optical transmitter according to a second exemplary embodiment of the present invention.

In order to facilitate understanding to the first exemplary embodiment of the present invention explained above, next, an explanation will be given of a second exemplary embodiment of the present invention. FIG. 6 is a diagram illustrating a structure of a polarization multiplexing optical transmitter according to the second exemplary embodiment of the present invention, and the same component as that of FIG. 1 will be denoted by the same reference numeral. As illustrated in FIG. 6, the polarization multiplexing optical transmitter according to the second exemplary embodiment of the present invention differs from the first exemplary embodiment in that the polarization multiplexing optical transmitter of this exemplary embodiment has no frequency dividing circuit 21 in FIG. 1, but the light phase modulator 8 performs phase modulation at the same frequency as that of Baud rate. In addition, in the second exemplary embodiment, the amount of delay by the delay circuit 10 is set to be a half cycle of Baud rate (half cycle of clock signal 9).

Figure 7:
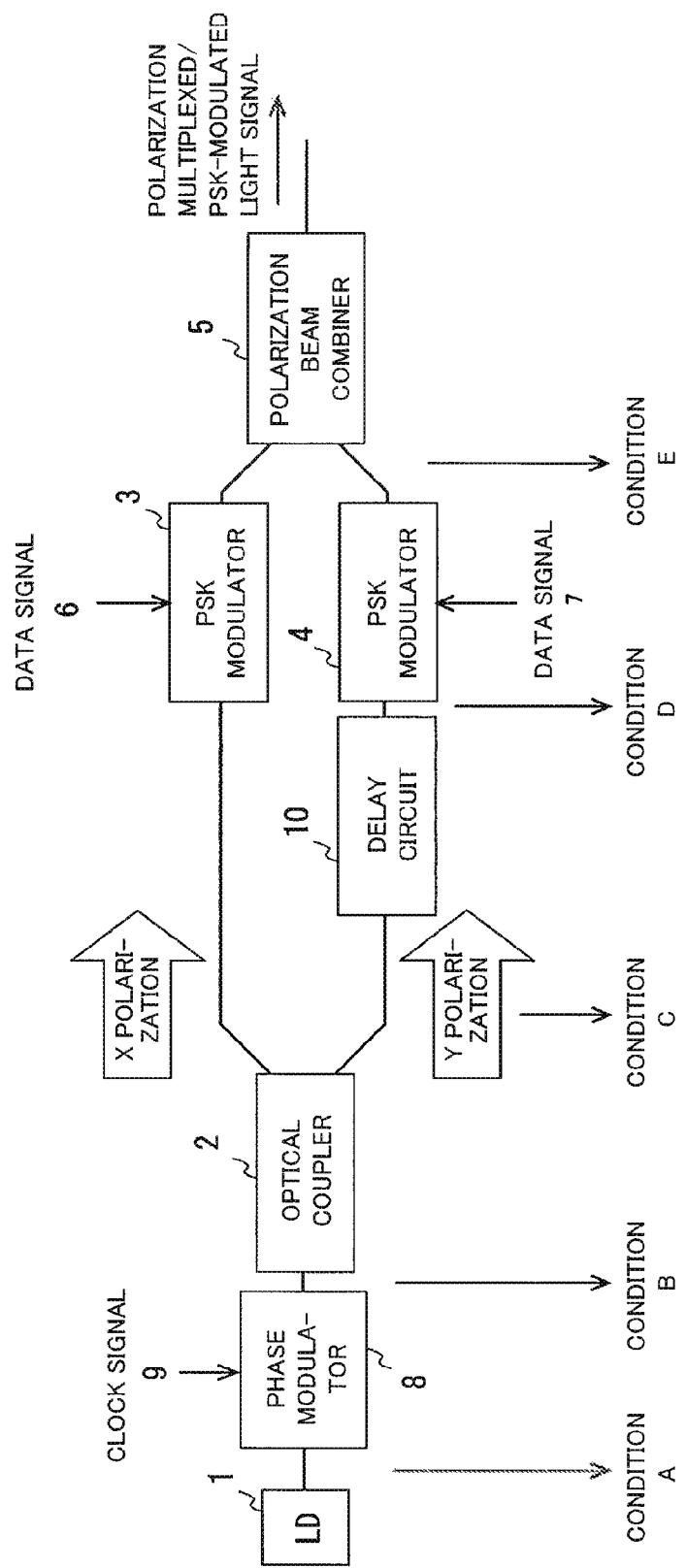
FIG. 7 is a diagram for explaining a transition in a modulation condition in a generating process of a polarization multiplexed light signal according to the structure in FIG. 6.

An explanation will now be given of a transition in a modulation condition in a generating process of a polarization multiplexed light modulation signal according to the second exemplary embodiment of the present invention with reference to FIGS. 7 and 8. In this example case, since the light intensity is always constant over time, the explanation will be given while focusing on the phase condition of light. The phase of light is constant (condition A) right after output by the LD 1. The phase of falls in a light condition like a condition B synchronized with the clock signal 9 in accordance with the clock signal 9 and by the phase modulator 8. Respective two lights (X polarization and Y polarization) are in the same phase condition like a condition C right after being branched by the optical coupler 2.

Next, with delay circuit 10 delaying only Y-polarized light by a half cycle of Baud rate, like a condition D, such a light becomes a phase modulated light having the phase inverted from that of the light at the X-polarization side. Subsequently, the PSK modulators 3, 4, perform data modulation on the respective phase modulated lights, and thus PSK light modulated signals like a condition E are obtained.

Figure 8:
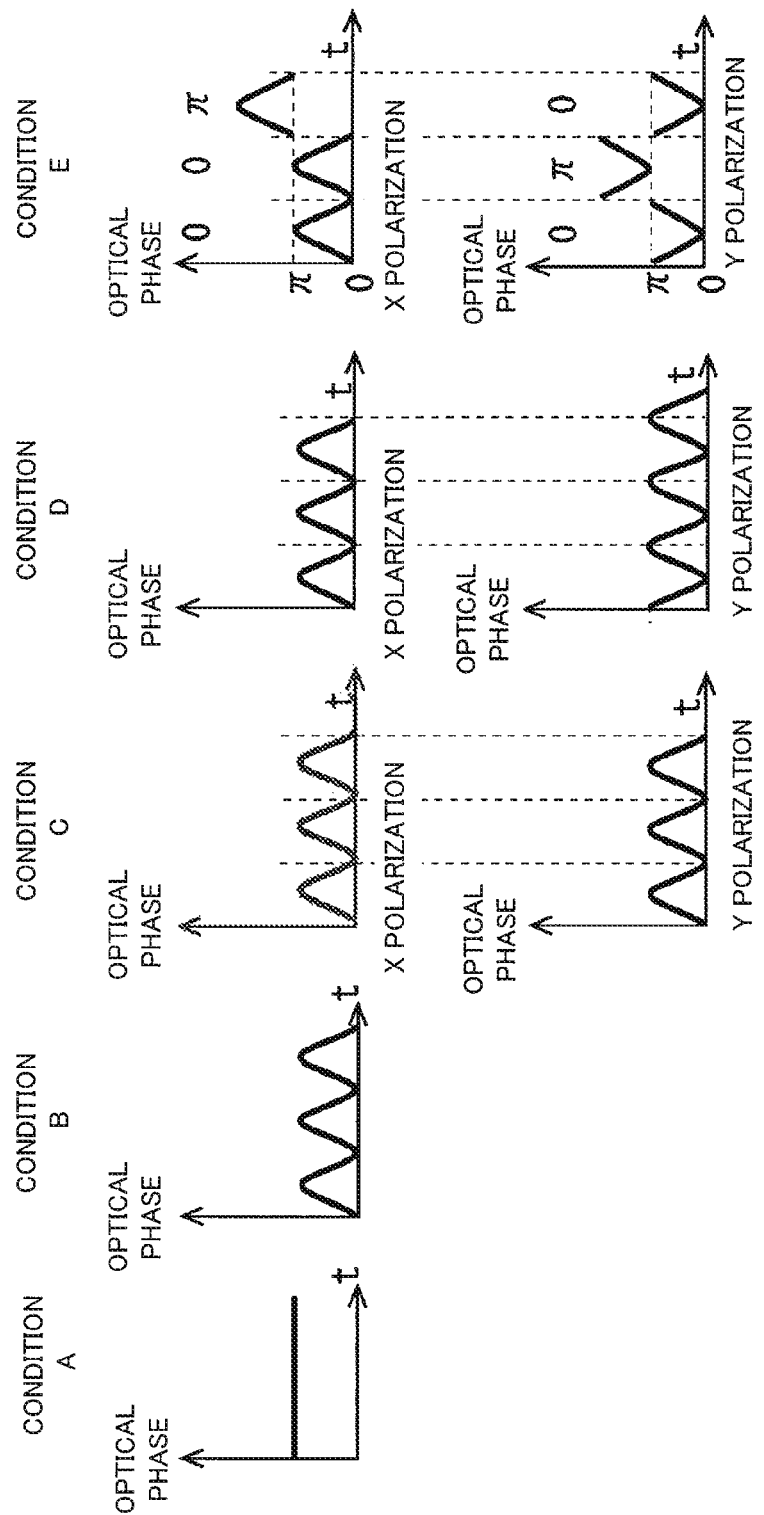
FIG. 8 is a diagram for explaining a transition in a modulation condition in a generating process of a polarization multiplexed light signal according to the structure in FIG. 6.
Figure 9:
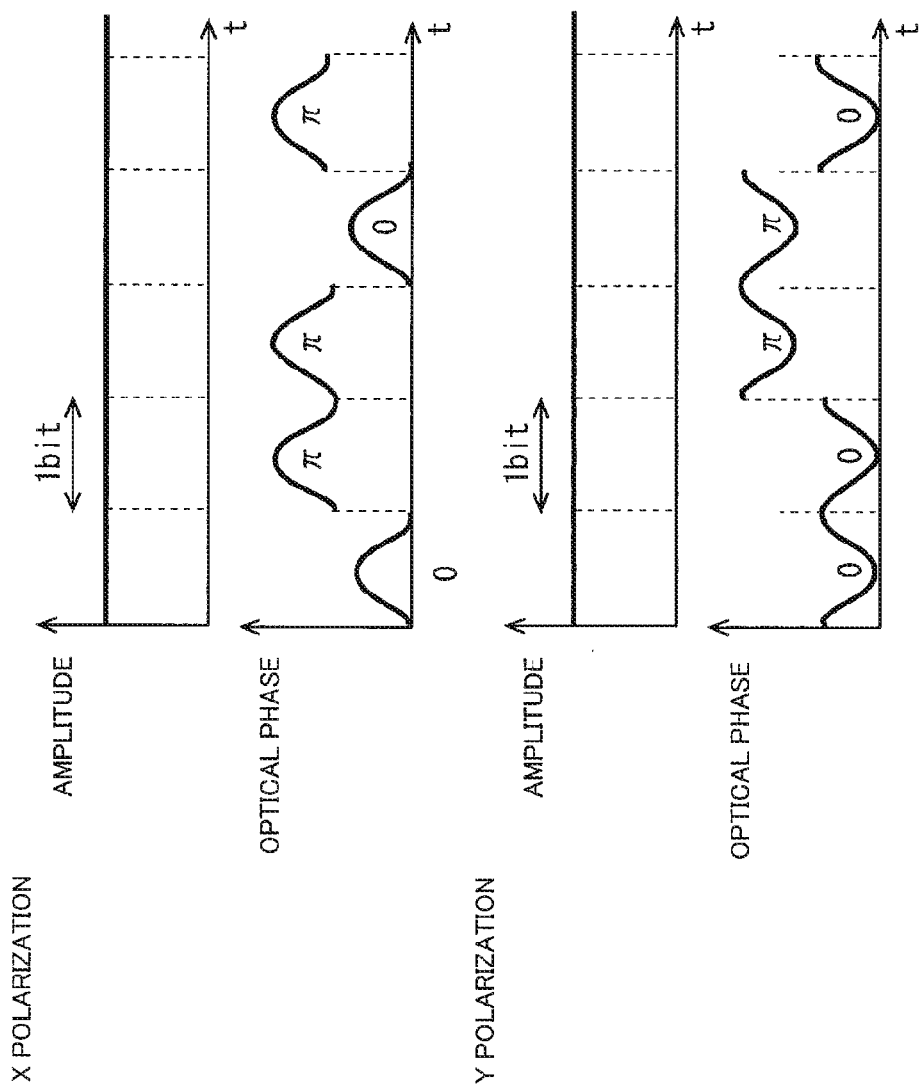
FIG. 9 is a diagram illustrating an example of an optical output by the polarization multiplexing optical transmitter in FIG. 6.

While the X and Y polarization light signals become the PSK-modulated signals modulated by the different data modulations based on the data signals 6, 7, respectively, like the condition E in FIG. 8 and as illustrated in FIG. 9, when the phase change curves of lights are compared with each other at the same time slot, the phase curves are inverted between the X polarization and the Y polarization. Note that FIG. 9 is a diagram illustrating an example of optical output by the polarization multiplexing optical transmitter in FIG. 6.

According to the second exemplary embodiment as explained above, X and Y polarization light signals are modulated with signals of different polarities. That is, since the polarity is inverted between the X polarization and the Y polarization, when a wavelength dispersion occurs during a transmission in an optical fiber, a different waveform change condition between the polarizations can be accomplished. Hence, a condition in which a weak correlation in waveform change between the polarized waves can be realized, thereby to ease the adverse effects of intra-polarized-wave XPM. Conversely, unlike the first exemplary embodiment of the present invention, according to the second exemplary embodiment, as illustrated in FIG. 9, an inverted condition of the phase polarity between the adjoining bits in the same polarized wave as illustrated in FIG. 5 does not occur.

Figure 10:
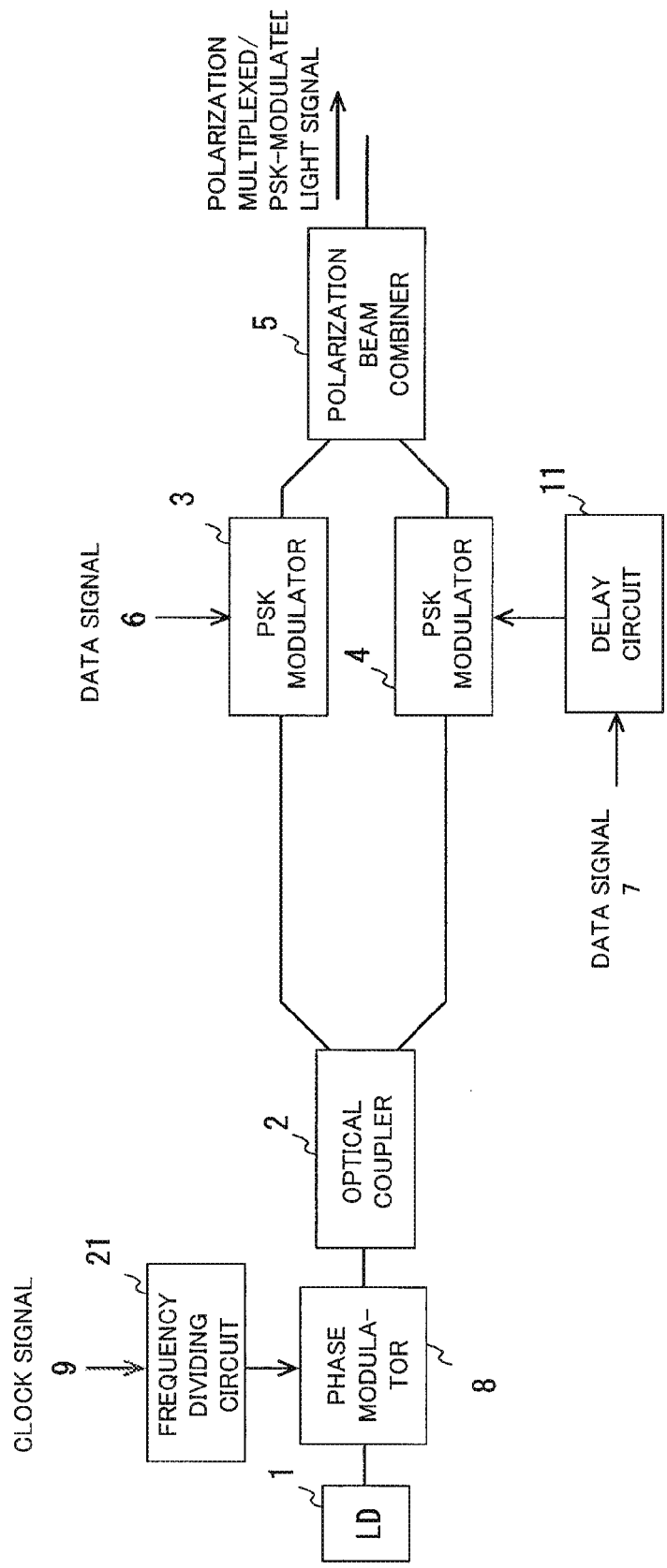
FIG. 10 is a diagram illustrating a structure of a polarization multiplexing optical transmitter according to a third exemplary embodiment of the present invention.

FIG. 10 is a diagram illustrating a structure of a polarization multiplexing optical transmitter according to a third exemplary embodiment of the present invention, and the same component as that of FIG. 1 will be denoted by the same reference numeral. As illustrated in FIG. 10, the polarization multiplexing optical transmitter of the third exemplary embodiment has the location of the delay circuit changed relative to the structure in FIG. 1, and a delay circuit 11 is disposed between the data signal 7 and the PSK modulator 4. The amount of delay by the delay circuit 11 is set to be a cycle of Baud rate (a cycle of the clock signal 9). According to the third exemplary embodiment of the present invention employing the above-explained structure, needless to say, the same advantageous effects as those of the first exemplary embodiment can be also accomplished.

Figure 11:
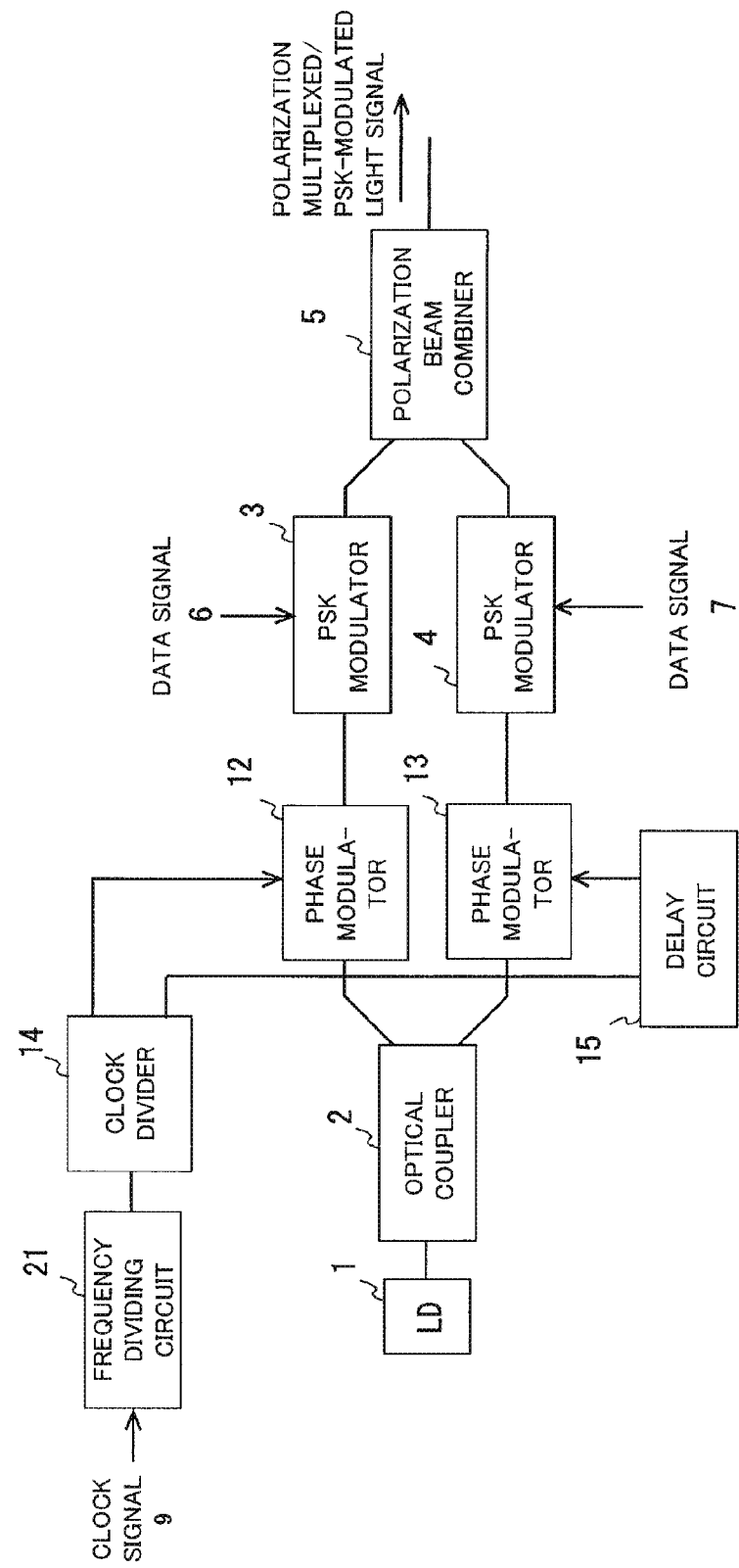
FIG. 11 is a diagram illustrating a structure of a polarization multiplexing optical transmitter according to a fourth exemplary embodiment of the present invention.

FIG. 11 is a diagram illustrating a structure of a polarization multiplexing optical transmitter according to a fourth exemplary embodiment of the present invention, and the same component as that of FIG. 1 will be denoted by the same reference numeral. As illustrated in FIG. 11, the polarization multiplexing optical transmitter of the fourth exemplary embodiment employs a structure in which the location of the phase modulator is changed relative to the structure in FIG. 1. After the frequency dividing circuit 21 divides the frequency of the clock signal 9 into half, the clock signal is branched into two signal components by a clock divider 14, and those signal components are supplied to phase modulators 12, 13 disposed at the following stage relative to the optical coupler 2. A delay circuit 15 is disposed between the clock divider 14 and the phase modulator 13, and the amount of delay by the delay circuit 15 is set to be a cycle of Baud rate (a cycle of the clock signal 9).

Hence, the phase modulator 12 performs phase modulation on the input light in accordance with the clock signal from the clock divider 14, while the phase modulator 13 performs phase modulation on the input light in accordance with the clock signal to which the delay is provided by the delay circuit 15. According to the fourth exemplary embodiment of the present invention employing the above-explained structure, needless to say, the same advantageous effects as those of the first exemplary embodiment can be also accomplished. Note that in the structure in FIG. 11, the PSK modulators 3, 4 may be disposed between the optical coupler 2 and the phase modulators 12, 13, respectively.

Figure 12:
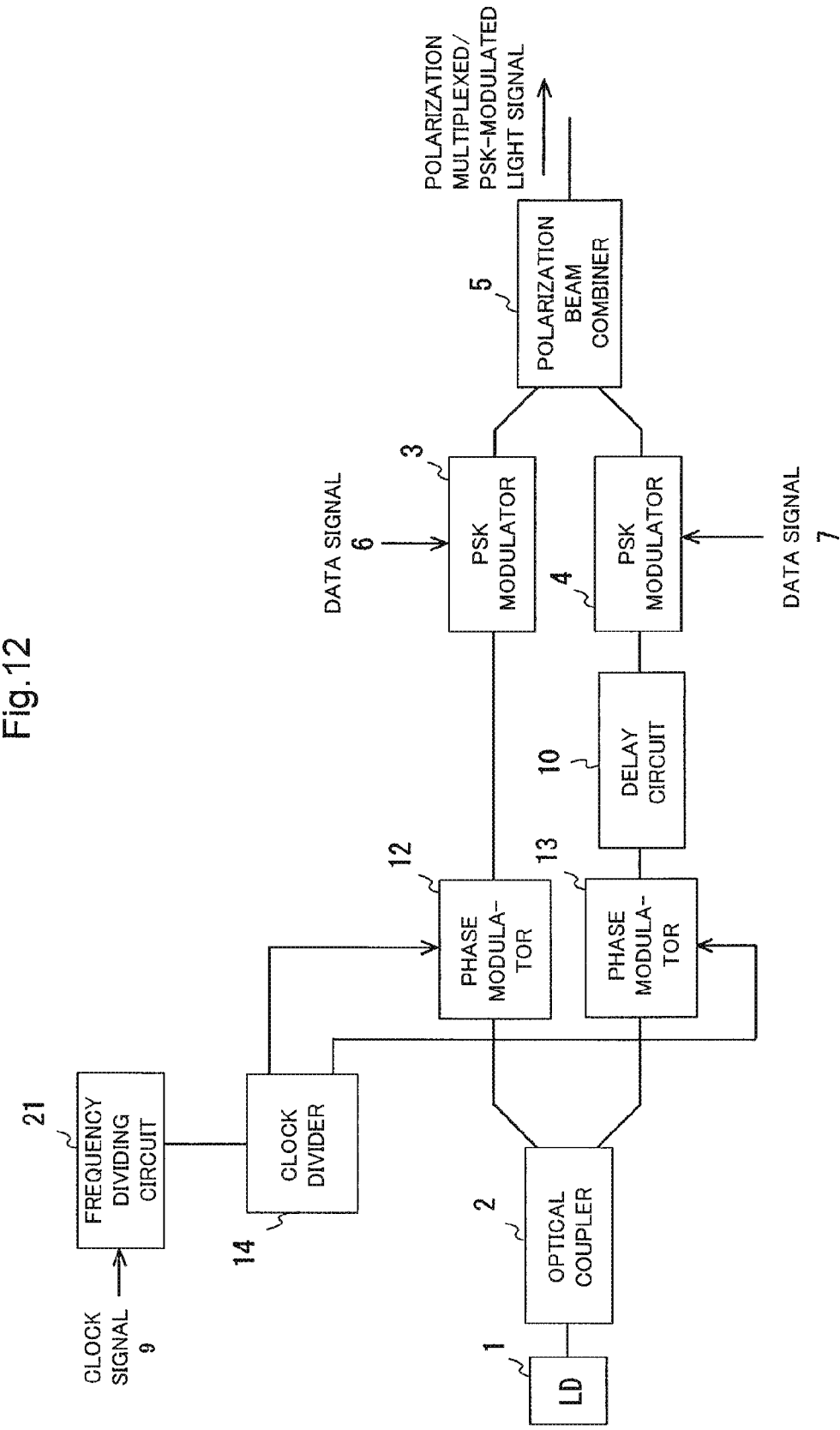
FIG. 12 is a diagram illustrating a structure of a polarization multiplexing optical transmitter according to a fifth exemplary embodiment of the present invention.

FIG. 12 is a diagram illustrating a structure of a polarization multiplexing optical transmitter according to a fifth exemplary embodiment of the present invention, and the same component as that of FIG. 11 will be denoted by the same reference numeral. As illustrated in FIG. 12, the polarization multiplexing optical transmitter of the fifth exemplary embodiment employs a structure in which the location of the delay circuit is changed relative to the structure in FIG. 11, and the delay circuit 10 is disposed between phase modulator 13 and the PSK modulator 14. Note that, the amount of delay by the delay circuit 10 is set to be a cycle of Baud rate (a cycle of the clock signal 9). According to the fifth exemplary embodiment employing the above-explained structure, needless to say, the same advantageous effects as those of the first exemplary embodiment can be also accomplished.

Figure 13:
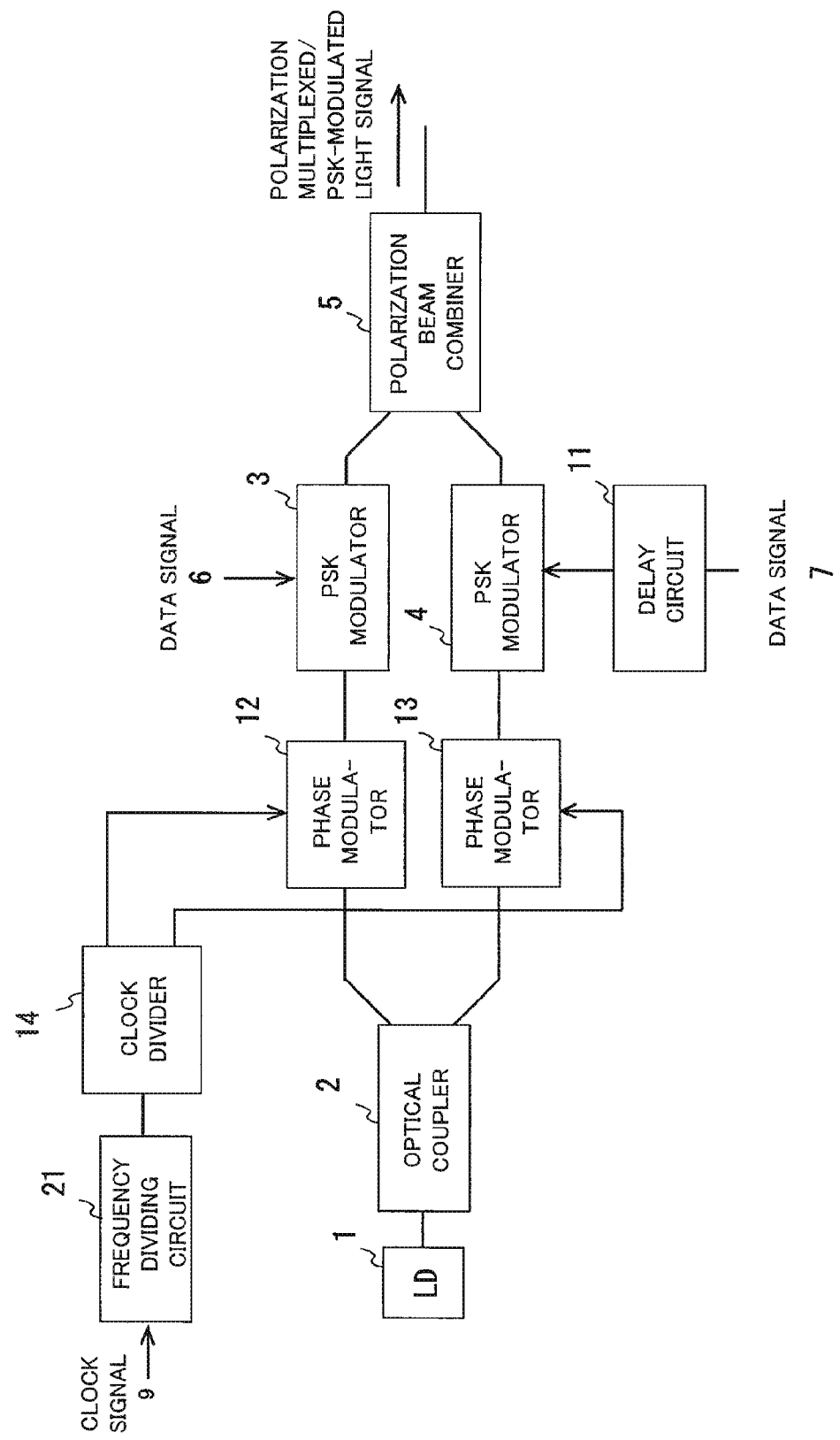
FIG. 13 is a diagram illustrating a structure of a polarization multiplexing optical transmitter according to a sixth exemplary embodiment of the present invention.

FIG. 13 is a diagram illustrating a structure of a polarization multiplexing optical transmitter according to a sixth exemplary embodiment of the present invention, and the same component as that of FIG. 11 will be denoted by the same reference numeral. As illustrated in FIG. 13, the polarization multiplexing optical transmitter of the sixth exemplary embodiment employs a structure in which the location of the delay circuit is changed relative to the structure in FIG. 11, and the delay circuit 11 is disposed in a route of the data signal 7 to the PSK modulator 4. The amount of delay by the delay circuit 11 is set to be a cycle of Baud rate (a cycle of the clock signal 9). According to the sixth exemplary embodiment employing the above-explained structure, needless to say, the same advantageous effects as those of the first exemplary embodiment can be also accomplished.

Figure 14:
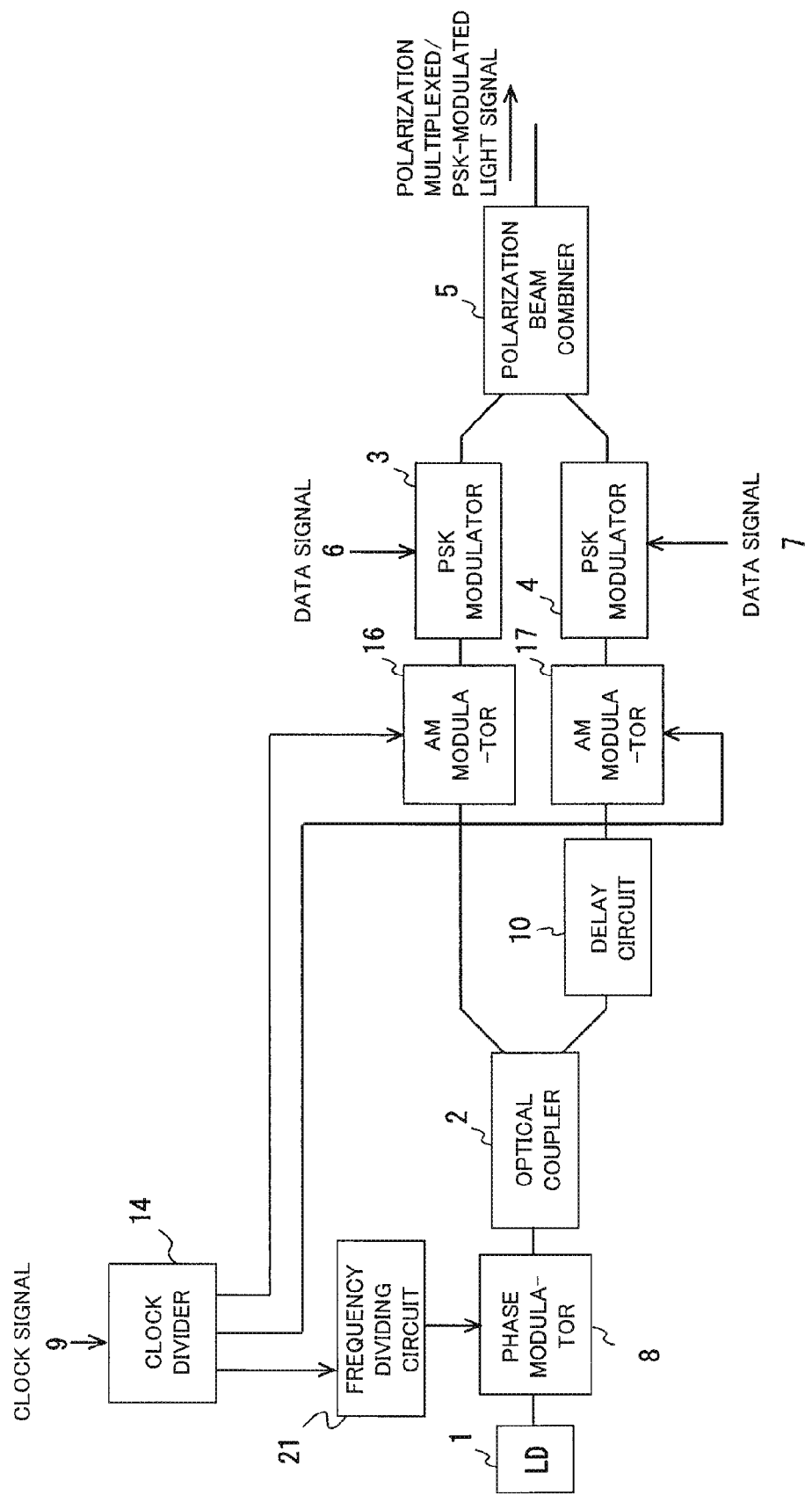
FIG. 14 is a diagram illustrating a structure of a polarization multiplexing optical transmitter according to a seventh exemplary embodiment of the present invention.

FIG. 14 is a diagram illustrating a structure of a polarization multiplexing optical transmitter according to a seventh exemplary embodiment of the present invention, and the same component as that of FIG. 1 will be denoted by the same reference numeral. As illustrated in FIG. 14, the polarization multiplexing optical transmitter of the seventh exemplary embodiment employs a structure in which an amplitude modulation (AM modulation) process in accordance with the clock signal 9 is further added to the structure in FIG. 1, and the clock divider 14 and AM modulators 16, 17 are added. The clock divider 14 supplies the clock signal 9 to the frequency dividing circuit 21, and the AM modulators 16, 17.

The AM modulator 16 performs amplitude modulation on an input light in accordance with the clock signal from the clock divider 14, while the AM modulator 17 performs amplitude modulation on an input light delayed by the delay circuit 10 in accordance with the clock signal from the clock divider 14. According to the seventh exemplary embodiment employing the above-explained structure, needless to say, the same advantageous effects as those of the first exemplary embodiment can be also accomplished. Note that in the structure in FIG. 14, the AM modulators 16, 17 may be disposed between the PSK modulators 3, 4 and the polarization beam combiner 5, respectively.

Figure 15:
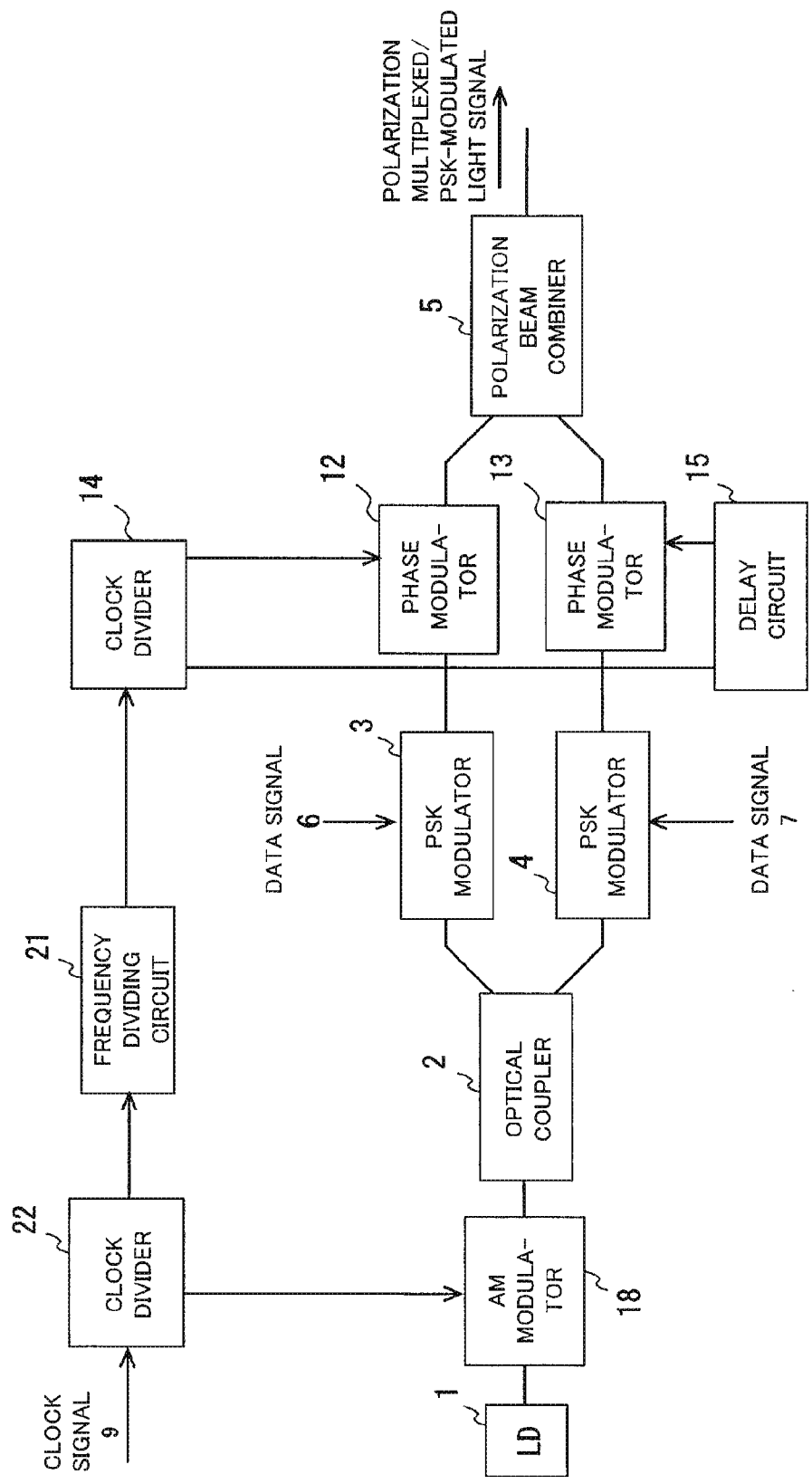
FIG. 15 is a diagram illustrating a structure of a polarization multiplexing optical transmitter according to an eighth exemplary embodiment of the present invention.

FIG. 15 is a diagram illustrating a structure of a polarization multiplexing optical transmitter according to an eighth exemplary embodiment of the present invention, and the same component as that of FIG. 11 will be denoted by the same reference numeral. As illustrated in FIG. 15, the polarization multiplexing optical transmitter of the eighth exemplary embodiment has an AM modulator 18 added between the LD 1 and the optical coupler 2 relative to the structure in FIG. 11. Unlike FIG. 11, the phase modulators 12, 13 are disposed between the PSK modulators 3, 4 and the polarization beam combiner 5 in FIG. 15, but it is needless to say that likewise FIG. 11, such phase modulators 12, 13 may be disposed between the optical coupler 2 and the PSK modulators 3, 4.

A clock divider 22 supplies the clock signal 9 to the frequency dividing circuit 21 and the AM modulator 18. The AM modulator 18 performs amplitude modulation on an input light in accordance with the clock signal 9 from the clock divider 22. According to the eighth exemplary embodiment employing the above-explained structure, needless to say, the same advantageous effects as those of the first exemplary embodiment can be also accomplished.

Figure 16:
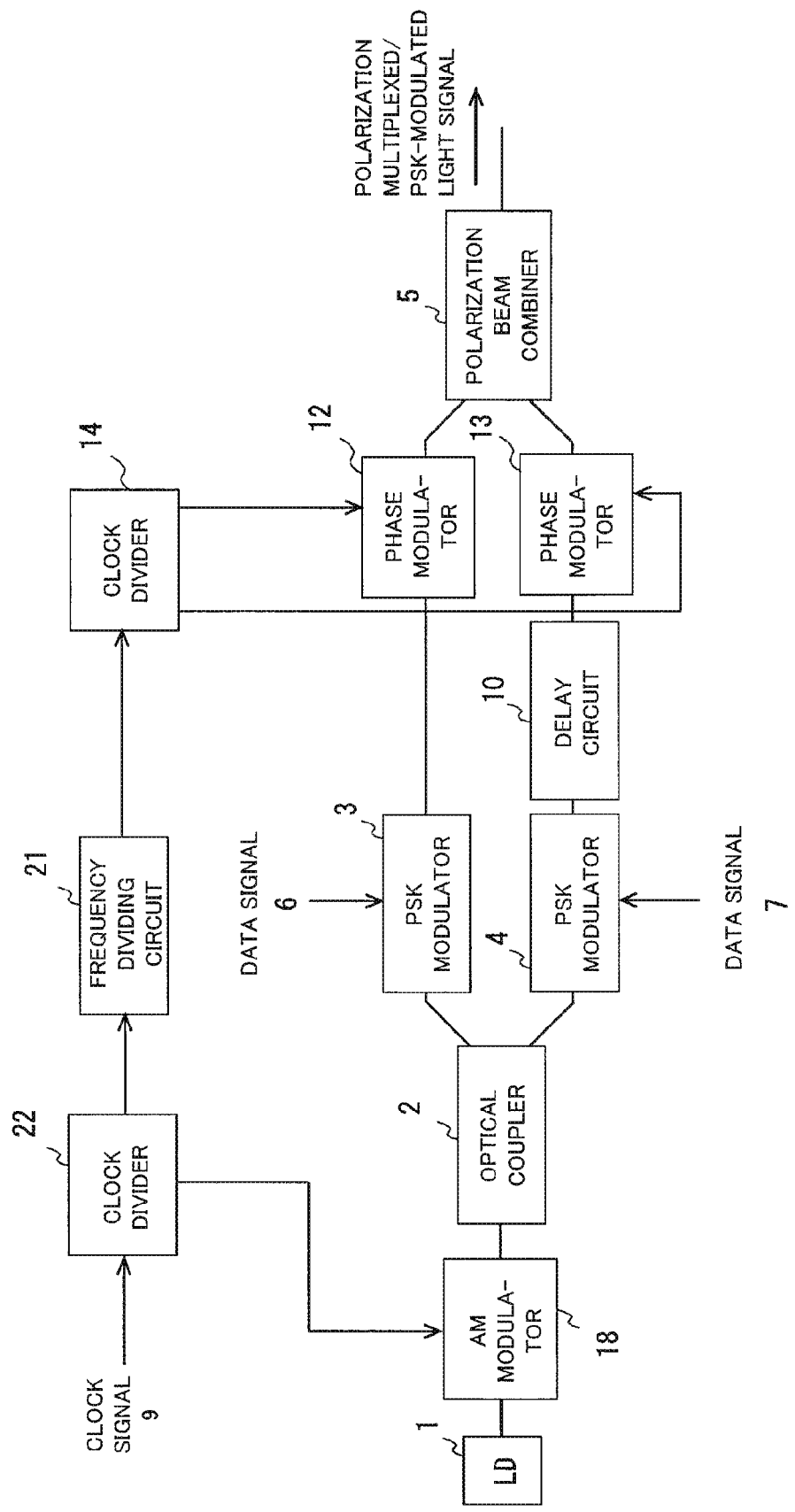
FIG. 16 is a diagram illustrating a structure of a polarization multiplexing optical transmitter according to a ninth exemplary embodiment of the present invention.

FIG. 16 is a diagram illustrating a structure of a polarization multiplexing optical transmitter according to a ninth exemplary embodiment of the present invention, and the same component as that of FIG. 15 will be denoted by the same reference numeral. As illustrated in FIG. 16, the polarization multiplexing optical transmitter of the ninth exemplary embodiment employs a structure in which the location of the delay circuit is changed relative to the structure in FIG. 15, and the delay circuit 10 is disposed between the PSK modulator 4 and the phase modulator 13. According to the ninth exemplary embodiment employing the above-explained structure, needless to say, the same advantageous effects as those of the first exemplary embodiment can be also accomplished.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2012-170697, filed on Aug. 1, 2012, the disclosure of which is incorporated herein in its entirety by reference.

REFERENCE SIGNS LIST

1 LD
2 optical coupler
3, 4 PSK modulator

5 Polarization beam combiner
6, 7 Data signal
8, 12, 13 Phase modulator
9 Clock signal
10, 11, 15 Delay circuit
14, 22 Clock divider
16, 17, 18 AM modulator
21 Frequency dividing circuit

The invention claimed is:

1. A polarization multiplexing optical transmitter comprising:
   a frequency dividing unit that performs frequency dividing on a clock signal having a Baud rate frequency;
   a phase modulation unit that performs phase modulation on a light signal in accordance with the clock signal having undergone the frequency dividing;
   a branching unit that branches the phase-modulated light signal into two branched light signals with polarizations orthogonal to each other;
   a delay unit that delays one branched light signal relative to the other branched light signal to generate light signals having phases inverted relative to each other and polarizations orthogonal to each other; and
   a polarization multiplexing unit that combines the generated light signals with phases inverted relative to each other and polarizations orthogonal to each other, to generate a polarization multiplexed signal.

2. The polarization multiplexing optical transmitter according to claim 1, wherein:
   the frequency dividing unit divides frequency of the clock signal having the Baud rate frequency to be half in frequency; and
   the delay unit delays the one branched light signal relative to the other branched light signal by a cycle of the clock signal having the Baud rate frequency.

3. A polarization multiplexing optical transmitter comprising:
   a frequency dividing unit that performs frequency dividing on a clock signal having a Baud rate frequency;
   a phase modulation and delay unit that
      performs phase modulation on two light signals having polarizations orthogonal to each other and having a same wavelength, in accordance with the clock signal having undergone the frequency dividing, and
      delays one phase-modulated light signal relative to the other phase-modulated light signal to generate light signals having phases inverted relative to each other and polarizations orthogonal to each other; and
   a polarization multiplexing unit that combines the generated light signals with phases inverted relative to each other and polarizations orthogonal to each other, to generate a polarization multiplexed signal.

4. The polarization multiplexing optical transmitter according to claim 3, wherein the phase modulation and delay unit comprises:
   a branching unit that branches the clock signal having undergone the frequency dividing into a first branched clock signal and a second branched clock signal; and
   a delay unit that delays the first branched clock signal relative to the second branched clock signal;
   wherein the phase modulation and delay unit is configured to perform phase modulation on the one light signal in accordance with the first branched clock signal, and perform phase modulation on the other light signal in accordance with the second branched clock signal, to generate the light signals having phases inverted relative to each other.

5. The polarization multiplexing optical transmitter according to claim 3, wherein:
   the frequency dividing unit divides frequency of the clock signal having the Baud rate frequency to be half in frequency; and
   the phase modulation and delay unit delays the one phase-modulated light signal relative to the other phase-modulated light signal by a cycle of the clock signal having the Baud rate frequency.

6. An operation control method for a polarization multiplexing optical transmitter, the method comprising:
   a frequency dividing step for performing frequency dividing on a clock signal having a Baud rate frequency;
   a phase modulation step for performing phase modulation on a light signal in accordance with the clock signal having undergone the frequency dividing;
   a branching step for branching the phase-modulated light signal into two branched light signals with polarizations orthogonal to each other;
   a delay step for delaying one branched light signal relative to the other branched light signal to generate light signals having phases inverted relative to each other and polarizations orthogonal to each other; and
   a polarization multiplexing step for combining the generated light signals with phases inverted relative to each other and polarizations orthogonal to each other, to generate a polarization multiplexed signal.

7. The operation control method according to claim 6, wherein:
   the frequency dividing step divides frequency of the clock signal having the Baud rate frequency to be half in frequency; and
   the delay step delays the one branched light signal relative to the other branched light signal by a cycle of the clock signal having the Baud rate frequency.

* * * * *